United States Patent Office 3,324,914
Patented June 13, 1967

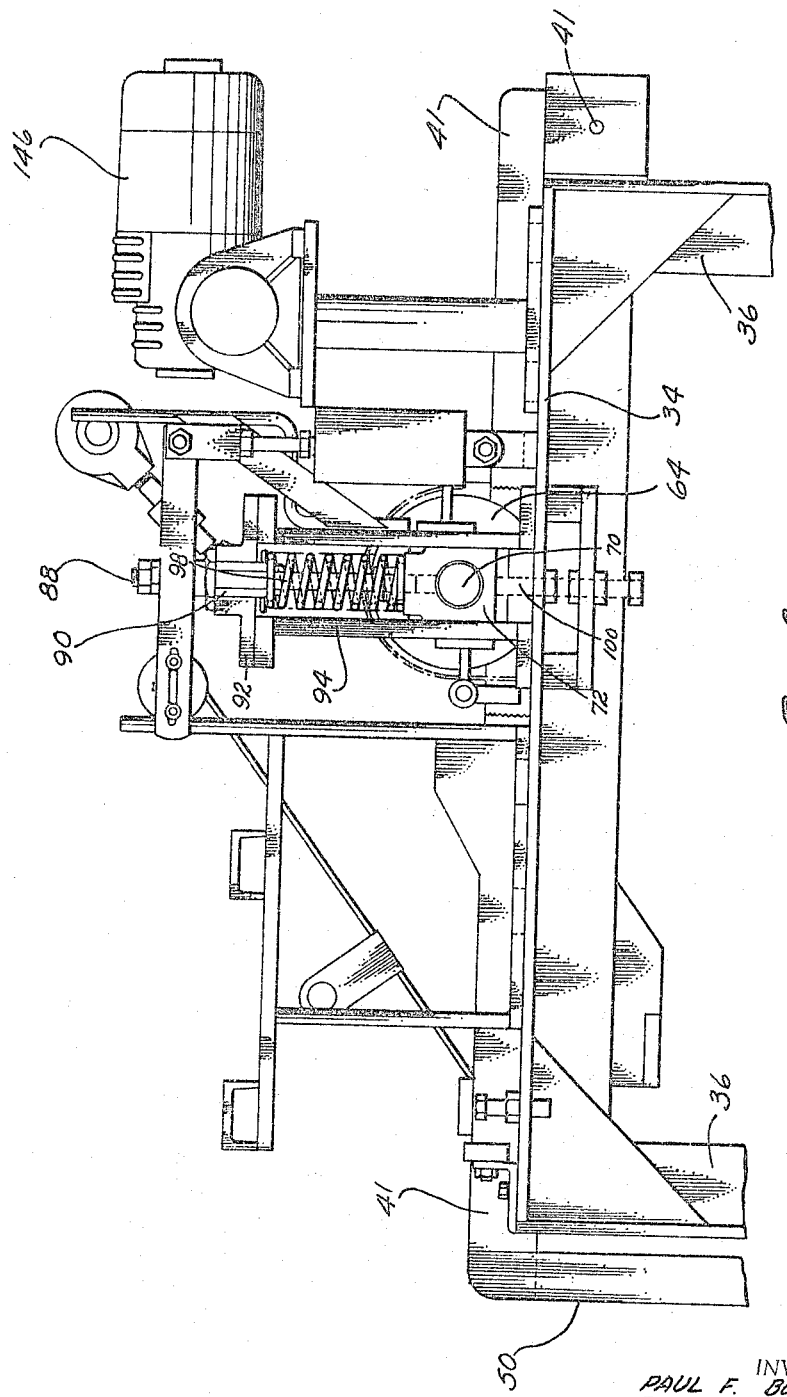

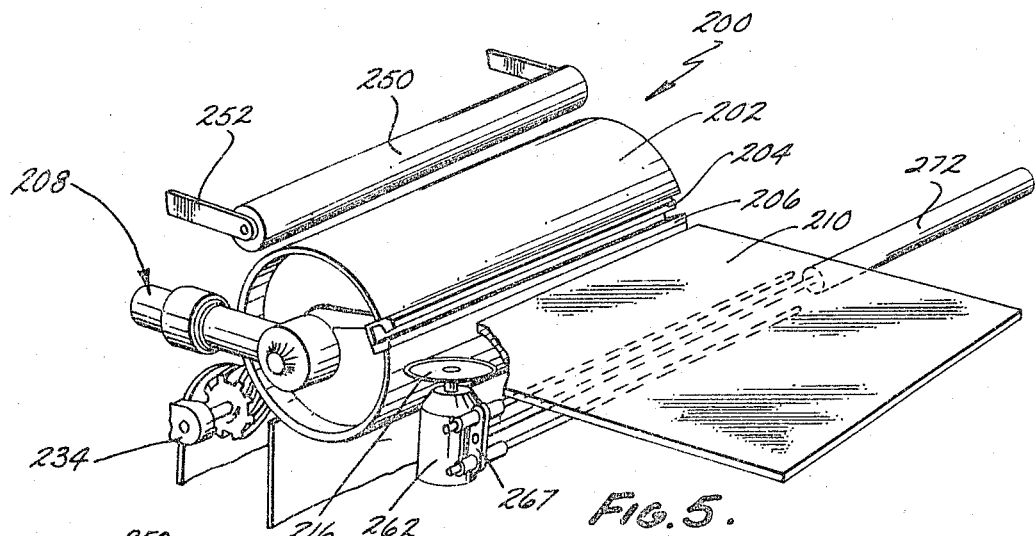
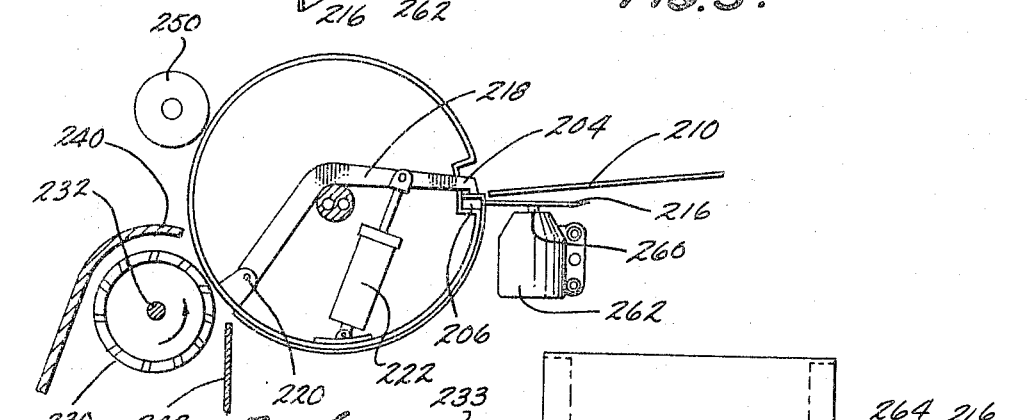
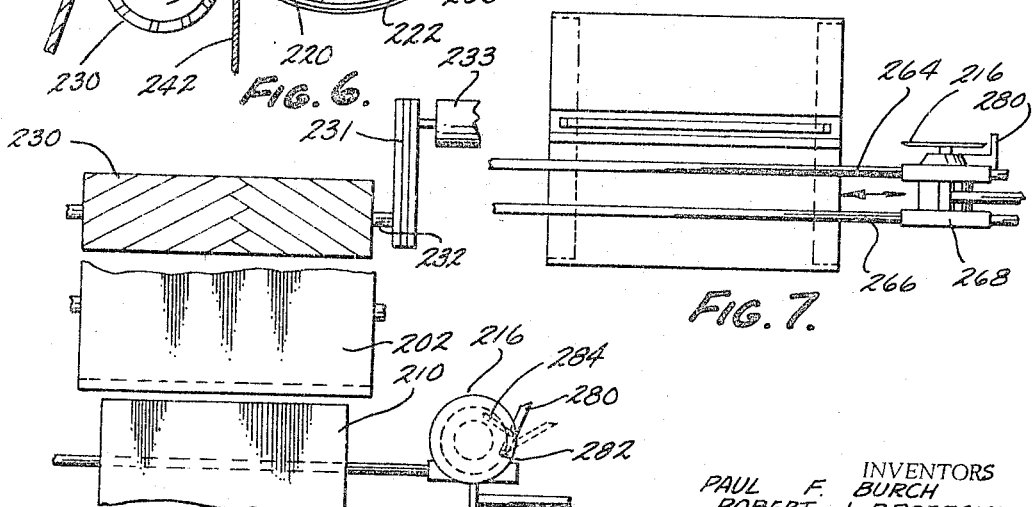
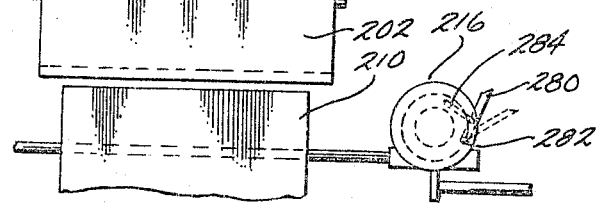

3,324,914
FLESHING APPARATUS
Paul F. Burch, Rockford, Robert J. Broersma, Spring Lake, and Ernest M. Reimer, New Era, Mich., assignors to Wolverine Shoe & Tanning Corporation, Rockford, Mich., a corporation of Michigan
Filed July 30, 1964, Ser. No. 386,304
13 Claims. (Cl. 146—79)

This invention relates to an animal skin fleshing machine, and also relates to a combination skinning and fleshing apparatus.

The assignee herein, a manufacturer of products made of pigskin, is chiefly interested in machines for skinning and fleshing hogsides. Consequently, the invention herein was developed primarily for and will be explained primarily with respect to skinning and fleshing of hogsides. Conceivably, however, the apparatus could be employed for skinning and/or fleshing of other animal sides within the broader aspect of the invective concepts.

Conventionally, the hogside is skinned on a drum by rotating the drum and clamped hogside past a skinning blade as shown for example in United States Patent 2,989,105. The skin is then taken from the machine and "fleshed" to remove the thin layer of remaining fatty type flesh from the skin. This is done by passing it between a high speed, revolving, bladed fleshing roll and a pair of presser rolls. Two machines and two operators are therefore required for skinning and fleshing. Each machine is of substantial size, weight, and complexity, costing many thousands of dollars.

To flesh a skin, an operator feeds the skin in between the fleshing roll and the presser rolls and allows the diagonal spinning blades to sever the fat from about half of the skin. The operator pulls sideways on the skin to keep the diagonally oriented fleshing blades from pulling the skin off the ends of the roll. This happens when the skin moves slightly off center due to the unbalanced lateral forces applied by the blades. The operator then separates the rolls, retracts the skin, turns it end for end, and feeds the remaining unfleshed half into the rolls. The completely fleshed skin is then retracted and placed in a container.

The entire fleshing process is not only time consuming and tedious, but in fact is dangerous since the flesher operator works perilously close to the sharp high speed blades of the revolving fleshing roll. Further, to be economical, the fleshing must be done extremely rapidly.

The fleshing operation is also normally necessary to remove the fatty wedge along the skin edge where the skinning drum clamp gripped the skin.

It is therefore an object of this invention to provide a combination machine allowing one operator and one machine to perform both skinning and fleshing operations, and to do so in the time normally required just for skinning.

It is another object of this invention to provide a machine allowing separation of the meat from the skin of a hogside and then severing the residual fat from the skin, all in one sweep of the hogside and skin. Moreover, this is done on a continuous basis, with complete separation of the resulting products into separate categories, i.e., meat slab, skin, and flesh.

It is another object of this invention to provide a fleshing machine allowing a drum-type feed that provides complete safety for the fleshing operator. He does not need to constantly pull laterally on the skin to keep it on the roll. Yet, the skin is not pulled to the side, due to the effective clamping action received.

It is another object of this invention to provide a drum-type fleshing machine that eliminates the necessity of sequential, partial fleshing by the operator, with end-for-end inversion of the skin.

Further objects of this invention are to provide a fleshing machine that rapidly, economically, and efficiently removes the fatty flesh from the skin in one stroke, and that rapidly and efficiently removes the clamped skin edge from the skin after the fleshing stroke.

These and several other objects of this invention will become apparent upon studying the following specification in conjunction with the drawings in which:

FIG. 4 is a fragmentary, elevational view of the opposite side of the apparatus illustrated in FIG. 1;

FIG. 5 is a perspective view of a second form of the invention, a fleshing machine;

FIG. 6 is a side elevational view of the machine in FIG. 5;

FIG. 7 is a front elevational view of the machine in FIGS. 5 and 6; and

FIG. 8 is a plan view of the machine illustrated in FIGS. 5 through 7.

Figure 1:
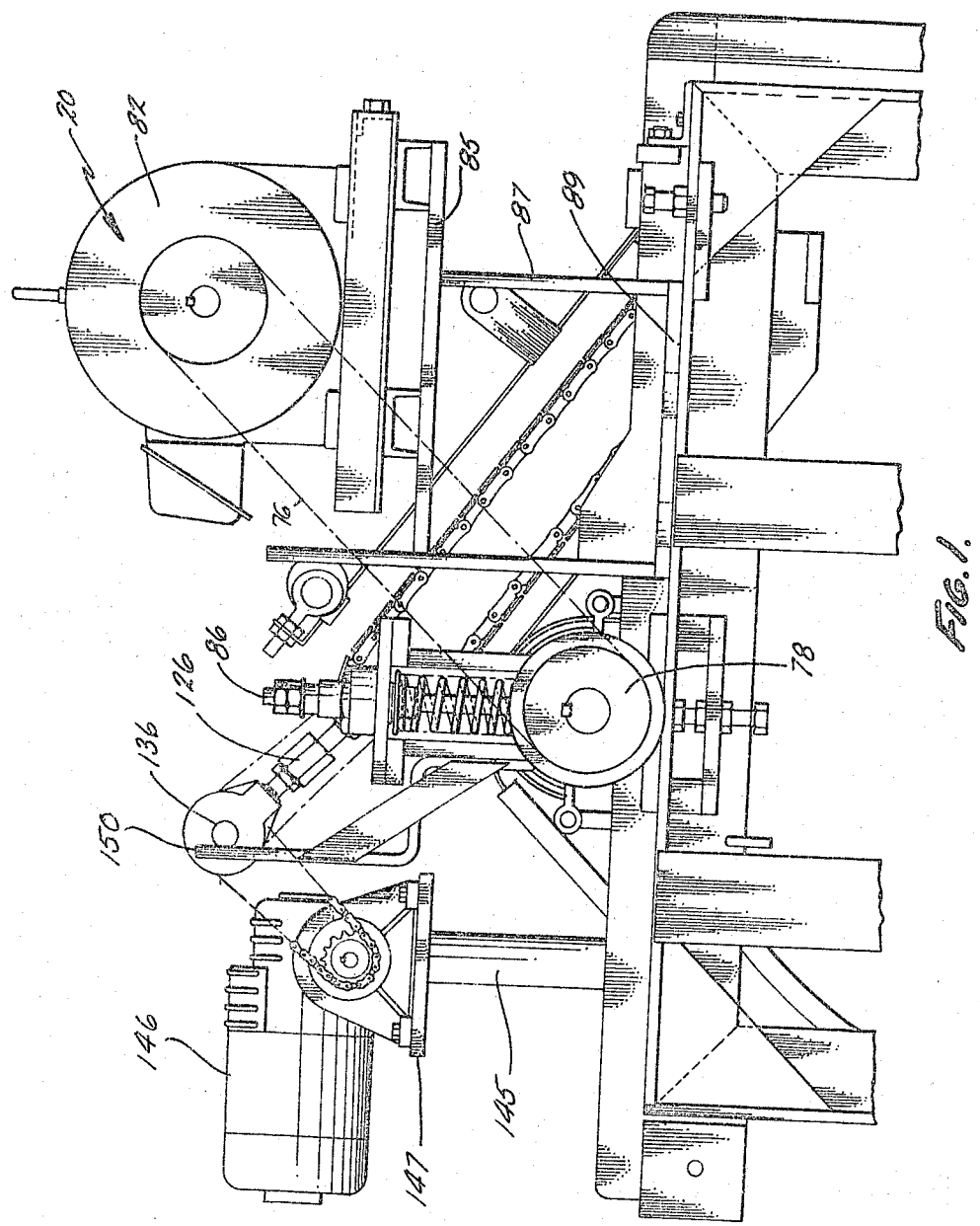
FIG. 1 is a side elevational view of the first form of the invention, a combination skinning and fleshing apparatus.

Referring now specifically to the drawings, the first form of the invention illustrated in FIGS. 1 through 4 is a combination fleshing and skinning apparatus utilizing a drum feed.

In FIGS. 5 through 8, a fleshing machine having a drum-type feed and a unique skin edge cut-off is shown as a second form of the invention.

Combination skinning and fleshing apparatus

Referring now to FIGS. 1 through 4, the complete skinning and fleshing apparatus 10 there shown includes a rotatable drum 12 and drive mechanism 14, skinning blade mechanism 16, fleshing apparatus 18 with its drive mechanism 20, and meat advancing and guide means 22.

The fleshing drum 12, rotatably journaled on an axis, is several feet in length, and a few feet in diameter. It includes an axially extending clamping mechanism 26 recessed in a notch in the drum periphery. This clamping mechanism may be of the two-jaw type illustrated in United States Patent 2,989,105, or preferably of the two-jaw and anchor pin type like that described and claimed in United States patent application, Serial No. 349,254 filed Mar. 4, 1964 and now Patent No. 3,291,175, granted Dec. 13, 1966. The drum is rotatably driven by an electric motor and gear box assembly 30 to revolve it one revolution at a time, at a constant rate, in the direction indicated by the arrow in FIG. 3. The ends of the drum are supported on a framework 32 which comprises interconnected transverse elements 34 with legs 36.

Pivotally attached to the frame at pivot axis 40 is a pair of support arms for the blade retaining bracket 42. The bracket 42 supports the axially elongated skinning blade 44. It has a pair of front stops 46 on the opposite ends of the drum and which the sharp edge of the blade abuts. It also has a pair of adjustable rear stops 48 for tightening the blade into position against the front stops. The blade 44 extends along the drum closely spaced thereto with just sufficient clearance to allow the skin to pass between the blade and the drum. The sharp blade edge is therefore tangential to the drum periphery.

A pair of support arms 41 support the opposite ends of the blade mounts, to be adjustable by shifting vertical extensions 50 to raise and lower the blade. This mechanism may be similar to that illustrated in the above identified patent application, Ser. No. 349,254. The skinning blade assembly is supported so that its sharp edge faces toward a loading platform means 60. The latter projects toward the periphery of the drum on a generally horizontal, or if preferred, slightly slanted orientation, so that the hogsides can be fed into the clamping mechanism 26 prior to rotation of the drum. In the preferred form of the invention, the skinning blade is mounted between loading platform 60 and the top of the drum.

Positioned near the top of the drum is fleshing apparatus 18. This includes a fleshing roller 64 which has a plurality of diagonally oriented fleshing blades around its periphery. These blades are from ¾ of an inch to 2 inches in depth, and meet corresponding diagonally positioned blades in the center of the fshing roll so that the two sets of interconnecting blades define wide spread V's. Typical of the configuration involved are the blades illustrated in the modified form of the apparatus in FIGS. 5 and 6.

Figure 2:
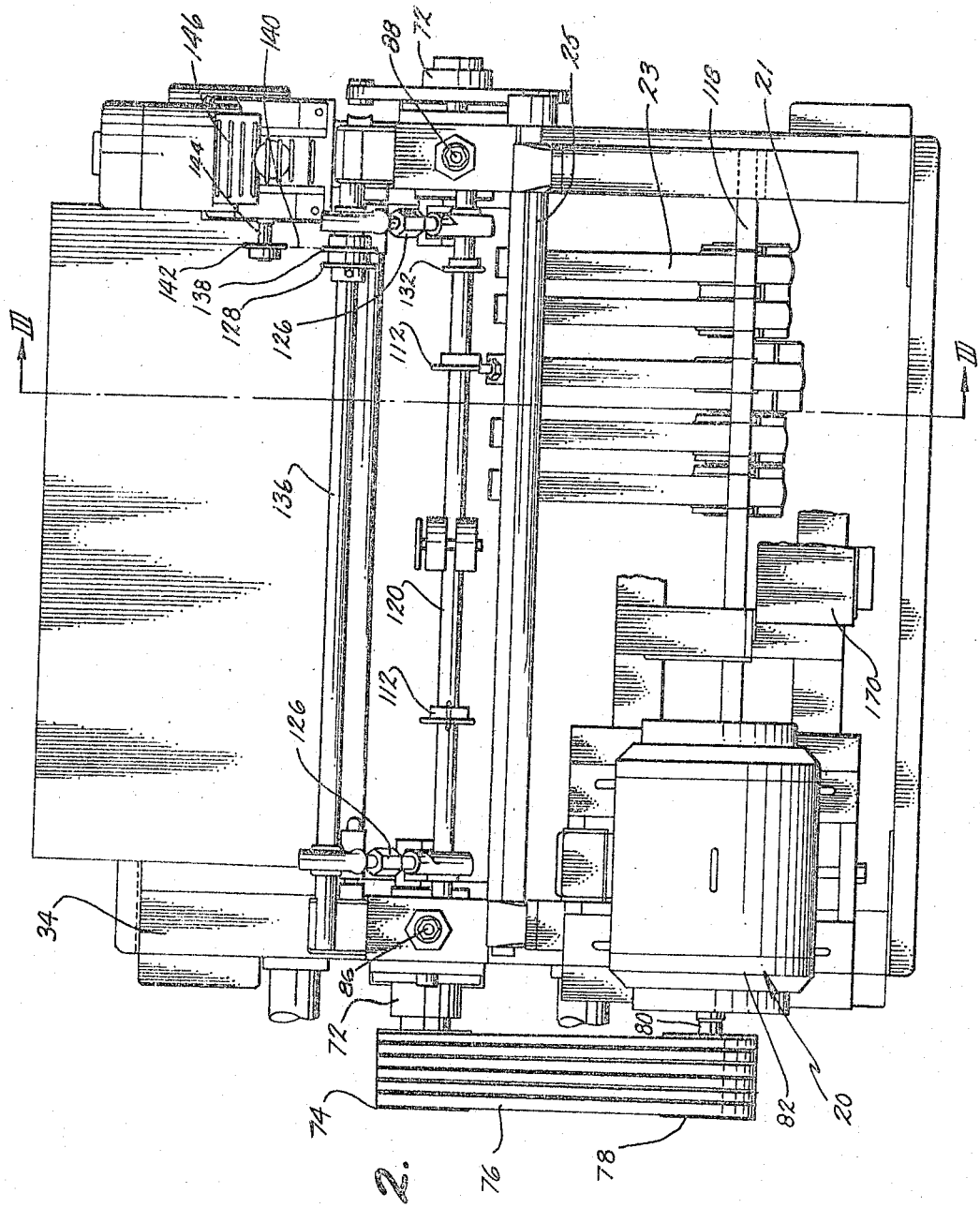
FIG. 2 is a plan view of the apparatus in FIG. 1.

The ends of the fleshing roll include shafts 70 (FIG. 3) supported in journals 72 (FIG. 2). The shaft is extended on one end and has mounted thereon a plurality of V-belt pulleys 74 to which V-belts 76 are operably connected. These V-belts also pass around pulley means 78 on shaft 80 of an electric motor 82 to rotate the flesher roll at high speeds. A biasing force is applied to each end shaft of the flesher roll, toward the drum, by an adjustable compression spring and shaft assembly. This comprises a pair of vertically extending threaded rods 86 and 88, each having an upper collar 90 threadably attached to a fixed cap 92 secured to the frame assembly through a hollow column 94. Compressed between each collar 90 and the corresponding movable journal 72 is a compression spring 98 to bias the bearing journals and thus end shafts 70 and flesher roll 64 to a predetermined position where the journals 72 abut the threaded stops 100 adjustably attached to the lower side of frame 34 (FIG. 4). The flesher rolls can thus be lifted against the force of the compression spring bias in case of excessive force due to an extra thick skin passed between the drum and the fleshing roll as the drum rotates.

Blade 44 severs the meat slab from the skin as the skin passes between the blade and drum. Normally, the hogside is held against the drum surface for proper feeding into the skinning blade by a plurality of adjacent conventional cylindrical rolls 21 (FIG. 2), each mounted on the end of a leaf spring 23 attached at its other end to a common axial support bar 25. (See also Patent 2,989,105.) As the meat slab passes over blade 44, it slides up a guide surface 104 extending from the rear of the blade where it is attached, up over the top of the flesher roll, and then down chute 106. This diverts the meat slab over the drum and fleshing roll without engaging them. Guide 104 is also attached at 108 to the framework. This guide extends laterally across the blade and fleshing roll to receive the entire slab of meat as it is passed upwardly and diagonally during the skinning process.

Figure 3:
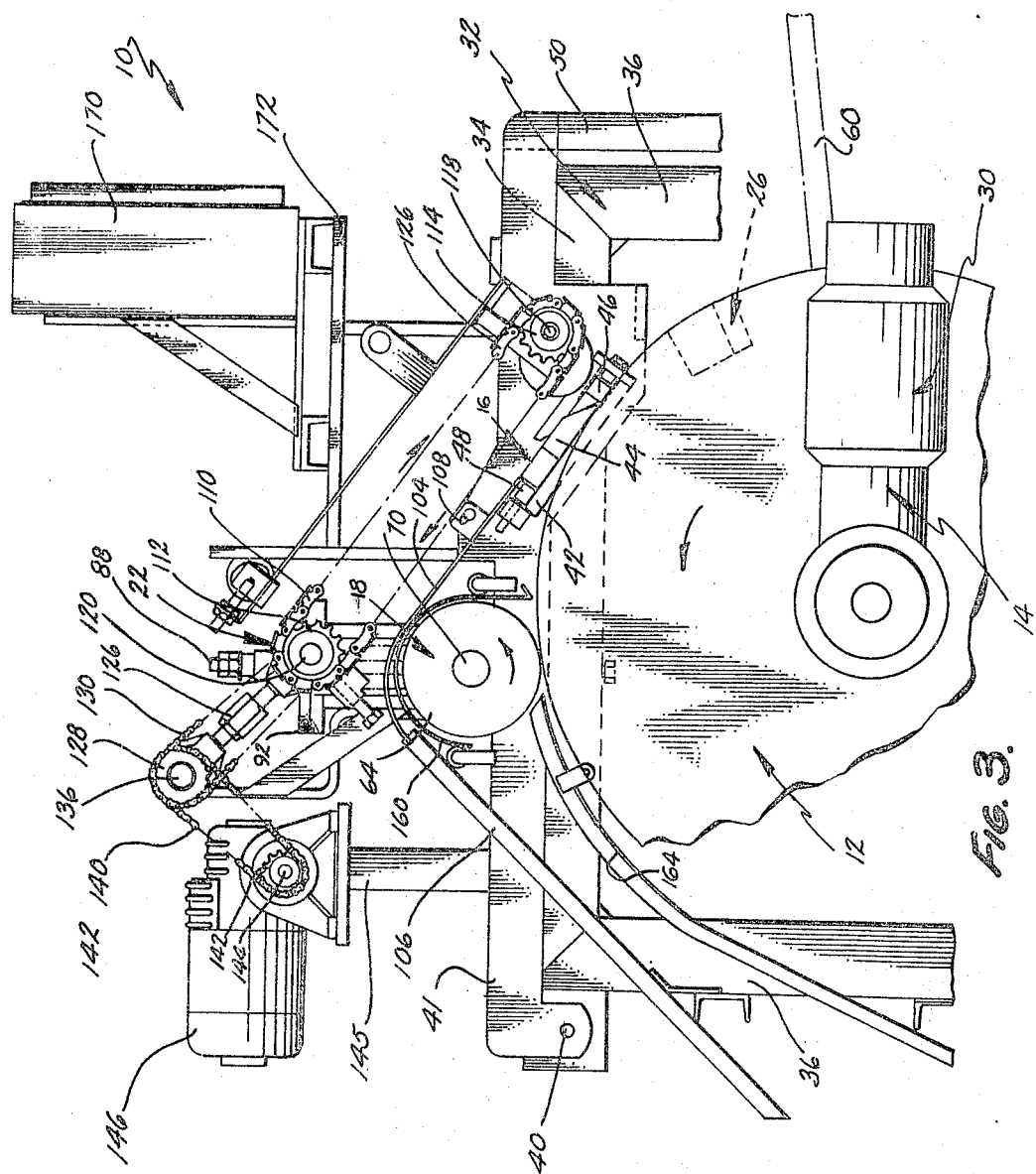
FIG. 3 is a sectional, fragmentary, elevational view taken on plane III—III of FIG. 2.

Meat advancing means 22 pushes the meat up the guide surface over the top of the fleshing roll. This advancing means 22 comprises an endless chain-type recirculatory mechanism 110. In the preferred form of the invention, it includes a pair of spaced chains and sprockets (FIG. 2). Each chain passes around a pair of sprockets 112 and 114 (FIG. 3). The plurality of lower sprockets 114 are mounted on a common shaft 118, as are the plurality of upper sprockets 112 on shaft 120.

To provide proper pressing and pushing action on the meat slab without damaging it, a plurality of adjacent presser feet or platelets 126 are attached to the individual chain links. The articulated presser feet move generally parallel to guide surface 104 and rest against the meat to pass it up over the fleshing roll and down chute 106. The biasing force of the feet against the meat is the weight of the advancing means. The upper end of advancing means 22, and specifically shaft 120, is pivotally mounted on the lower ends of a pair of support arms 126. The advancing means, therefore, rests on the meat slab as it passes up over the flesher roll.

On the upper ends of arms 126 is mounted a pair of sprockets 128 which drive chains 130 on opposite ends of the apparatus. The chains in turn drive special sprockets 132 on shaft 120 to rotate the shaft and thus cause the presser feet to move. Sprockets 128 are mounted on transverse shaft 136 driven by sprockets 138, chains 140, and sprockets 142 operably attached to drive shaft 144 of motor and gear box assembly 146. Thus, the operation of motor 146 causes the continuous movement of the presser feet 126 to advance the meat slab. Shaft 136 is supported on its opposite ends by bracket means 150 secured on the lower ends of the frame.

The drive motor 146 and its related sprocket and mount assembly is supported on a platform 147 integral with a vertical column 145 extending upwardly from the framework of the apparatus. The flesher motor 82 and its drive assembly are supported on a fixed mounting platform 85 affixed by panels 87 and base 89 (FIG. 1) to the framework of the assembly.

Extending up over the fleshing roll 64 is a semcylindrical, elongated, retention guard 160 to cause the fatty flesh cut from the skin and thrown off the fleshing roll to be dropped on the surface of lead-off guide plate 164. This plate extends the length of the fleshing roll and follows around the curvature of the drum between the drum and chute 106 to lead the fatty material off to a separate receptacle.

The skin moves beneath this surface as it passes by the fleshing roll clamped in clamping mechanism 26 of the drum.

Preferably, a suitable control panel 170 is supported on suitable mounting means 172 to allow the operator of the apparatus to activate, deactivate and adjust the various components as necessary.

*Operation*

To utilize this apparatus, only one operator is necessary. In fact, the mechanism can be completely automated if desired. To start the machine, motor assembly 30 to operate the drum is placed in an activatable state. Motor 146 is then started to initiate the meat slab advancing mechanism 22. The flesher driver motor 82 is also activated to rotate the fleshing roll at high speeds. The blade depth is adjusted utilizing extensions 50 to pivot arms 41 around pivot mount 40. Clamp 26 is normally held in a position just above feed-in platform 60. This can be achieved through suitable limit switching. The mechanism is preferably set-up electrically to make one revolution when activated, and then to automatically stop. Suitable circuitry for achieving this may be similar to that illustrated in the above identified patent application, Ser. No. 349,254.

As the hogside is fed in across platform support 60 into clamp 26, the clamp jaws are actuated to grip the edge of the hogside. The drum then begins to rotate in the direction indicated by the arrow in FIG. 3. As the drum rotates, the leading edge of the skin passes beneath blade 44, causing the meat to be sliced from the skin. The skin passes on around the drum, while the meat slab passes up over the blade and onto support 104. The articulated presser shoes 126 contact the meat slab and advance it over the fleshing roll and down chute 106.

The skin continues to move beneath fleshing roll 64 operated at high speeds in the direction indicated by the arrow in FIG. 3. The diagonal blades slice the thin layer of fatty flesh from the surface of the skin as it passes, with the flesh being dropped onto lead-off 164. The skin continues to move on around the drum until the drum makes almost a complete revolution at which time the clamp is open and the skin is dropped into a suitable container (not shown).

It will thus be seen that with one revolution of the drum, both skinning and fleshing are achieved. Yet, neither operation interferes with the other, but merely supplements it. The three products are also separated automatically for further processing as necessary. The mechanism allows both to be achieved with one operator and one machine. The elongated skinning clamp 26 prevents the skin being fleshed from being diverted laterally on the drum as it passes the diagonal fleshing blades. As soon as the drum has made one complete revolution, the next hogside is fed into the clamp to repeat the cycle. The two operations can be achieved in practically the same amount of time normally required just for the skinning operation. The machine, furthermore, present no danger to the operator because the blades on the high speed fleshing roll are completely guarded and in a position away from the operator. Yet, if the fleshing roll encounters a particularly hard portion on the skin, it reacts automatically and shifts against its biasing springs for a temporary adjustment.

Additional advantages will undoubtedly be apparent to those skilled in this field upon studying this particular disclosure. It is conceivable that the elements can be shifted around somewhat to achieve the skinning and fleshing in slightly different positions on the drum. However, it is preferable to have the flesher roll adjacent the top of the drum for best action. Therefore, the skinning blade must be in the arc between the feed platform and the top of the drum.

*Fleshing machine*

Referring now to FIGS. 5 through 8, the particular modified form of the invention comprising a fleshing machine with an automatic skin flap cut-off is illustrated. This complete apparatus 200 comprises a drum 202 of elongated cylindrical type. It has an elongated peripheral notch in which a shiftable clamping jaw 204 is mounted to cooperate with a fixed clamping jaw 206.

The rotatably mounted drum is operably connected to a controlled motor and gear box assembly 208 to rotate it one revolution at a time. Preferably, the drum is electrically controlled or pneumatically controlled to index at a position where the clamp is aligned with horizontal feed-in platform 210 oriented toward the side of the drum.

Shiftable jaw 204, when opned, is above platform 210 to receive a skin between it and the lower jaw. The lower jaw has portions 206 extending beneath platform 210. These portions form a stop surface for a special cutting blade 216. Shiftable jaw 204 is actuated by a pair of arms 218 on opposite ends of the drum in a manner similar to that illustrated in United States Patent No. 2,989,105. The opposite ends of the arms are pivotally mounted at 220 to the drum, with extension fluid cylinders 222 having their lower ends affixed to the drum and their extended ends of the piston rod attached to the arms intermediate the ends thereof.

The fleshing roll with its diagonal peripheral blades 230 has its axis parallel to the drum axis. It has end shafts 232 mounted on journals 234. It is driven by a belt drive 231 from motor 233. In this instance, as previously, the fleshing roll is biased toward the drum periphery by compression springs or the like, so that, with an excess thickness, the pressure roll can shift against its bias momentarily. The details of the biasing means are like those at 90, 92, 94, and 98 in FIG. 4.

A pair of retention surfaces 240 and 242 are mounted on both sides of the fleshing roll, leaving an opening where the fleshing roll cooperates with the drum periphery. The fatty flesh severed from the skin is retained thereby and dropped into a suitable container. In this form of the invention, the fleshing roll is shown to be alongside the drum instead of above the drum top. However, this is just shown as one possible alternative and is not necessarily the preferred form of the invention. Near the fleshing roll is a guide roll 250 mounted on suitable arms 252 to retain the skin against the drum.

Mounted immediately beneath the feed-in platform 210 for the skin to be fleshed is a circular cutting blade 216 attached to the revolving shaft 260 of an air or electric motor 262. The apparatus is suspended on a pair of guideways in the form of bars 264 and 266 vertically spaced one above the other. The supporting bracket on the motor includes a pair of collars 268 fitting over these bars. This allows the unit to be slid therealong. The unit is preferably shifted by suitable power means such as a fluid cylinder 272, the extended end of which is attached to mounting bracket 267 on the motor 262. The unit is shiftable from one end of the drum to the other to cause the revolving blade to abut insert element 206 forming one jaw of the clamp. Element 206 is made of wood or plastic or the like to cooperate with blade 216 without dulling it.

Mounted to the motor, alongside blade 216, is a wiper arm 280 which is pivotally attached at 282 to the motor assembly. It has a bias toward the drum due to a tension spring 284 extending between it and the motor. Alternatively, a torsion spring is attached around pivot mount 282.

During the movement of cutting blade 216 from one end of the drum to the other to cut off the clamped skin edge, diagonal wiper 280 is shifted against its bias to the position illustrated in dotted lines in FIG. 8 as it contacts and slides over the skin. On the return sweep however, after moving past the far skin edge, it shifts back to its solid line position to wipe the severed skin edge out of the clamp after clamping jaw 204 is lifted.

In operation, therefore, the skin (which has been previously severed from the meat on the hogside) is fed in on surface 210 to a position having its edge between the two open clamping jaws. The clamp is then actuated to grasp the skin edge, with the fleshy side up and out away from the drum. The drum is then rotated one complete revolution. As the skin is pulled past the fleshing roll, the flesh is severed therefrom. When the drum makes one complete revolution to its initial indexed position, it is positioned with jaw bar 206 adjacent cutting blade 216. Motor 262 and its revolving blade are then shifted axially across the drum by extension of cylinder 272. This causes the blade to sever the clamped, unfleshed, skin edge from the remainder of the skin. Normally, this is a relatively small edge and only creates further fleshing problems if left on the skin. In fact, due to the uneven edge to be clamped, only one or two uneven edge portions may be inside the clamp. After the blade severs this edge from the skin, the main portion of the skin drops from the drum. On the return swipe of the assembly, by contracttion of cylinder 272, wiper arm 280 pushes the severed edge out of the opened clamp jaws and readies the unit to receive the next skin to be fleshed.

It will be realized that, for convenience, some of the elements in the second form of the invention are illustrated more schematically rather than including their manufacturing details. Anyone having ordinary skill in the art could alter the basic support assembly in various different ways to fit a particular situation, while employing the basic combination shown and described.

The skin can be completely fleshed with one cycle of the drum with the apparatus. There is little danger to the operator because of the fleshing blades. The skin need not be pulled out of the flesher when half completed, to assure complete fleshing since the single revolution of the drum achieves this. The only part of the skin not fleshed is the tiny edge flap, and this is automatically removed.

Additional advantages of the apparatus illustrated will undoubtedly occur to those in the art upon studying the two specific forms of the invention. Conceivably, for example, certain features ilustrated in FIGS. 5 through 8 could be combined with certain of the features illustrated in FIGS. 1 through 4, or vice versa. Consequently, the

We claim:

1. A combination skinning and fleshing apparatus comprising: a drum with axially elongated clamping means; rotational drive means operably connected to said drum to drivingly revolve it on its axis; side feed-in support means extending to the drum along one side thereof; skinning blade mounting means adjacent said drum; skinning blade means supported by said mounting means and extending axially across a peripheral portion of said drum, closely spaced from said drum; said blade means being positioned on said drum arcuately spaced from said feed-in support means in the direction of rotation of said drum; fleshing roll mounting means adjacent said drum; a fleshing roll rotatably supported on said mounting means and positioned closely adjacent said drum, spaced arcuately from said blade means in the direction of rotation of said drum; and drive means operably connected to said fleshing roll, whereby, by rotating said drum with a side, meat is separated from the skin and the skin is fleshed.

2. A combination skinning and fleshing apparatus, especially suitable for hogsides, comprising: a revolvable, rotationally driven drum for pulling a hogside around its periphery; a hogside feed-in support oriented toward the periphery of said drum; skinning blade means mounted adjacent a peripheral surface portion of said drum and having its cutting edge oriented generally toward said feed-in support; fleshing means mounted adjacent said drum in cooperative relation thereto; said blade means being positioned generally between said fleshing roll means and said feed-in support; and meat slab take-off means extending from said blade means generally above said drum and fleshing means.

3. A combination skinning and fleshing apparatus comprising: a meat side pulling drum; rotational drive means operably connected to said drum to drivingly revolve it on its axis in one direction for pulling a meat side around its periphery; meat side feed-in support means extending to the drum along one side thereof; skinning blade mounting means adjacent the ends of said drum; skinning blade means supported by said mounting means and extending axially across a peripheral portion of said drum, closely spaced from said drum; said blade means being positioned on said drum, arcuately spaced from said feed-in support means in the direction of rotation of said drum; fleshing roll mounting means adjacent said drum; a fleshing roll rotatably supported on said mounting means and positioned closely adjacent said drum, spaced arcuately from said blade means in the direction of rotation of said drum; rotational drive means operably connected to said fleshing roll; meat slab guide surface means extending from said blade means up over said fleshing roll; and meat advancing means operably associated with said guide surface means and driven in a direction away from said blade means and along said guide surface means to advance meat therealong to clear said fleshing roll.

4. The apparatus in claim 3 wherein a flesh removal guide surface extends from said fleshing roll over a portion of said drum to clear the severed flesh over the drum.

5. A combination skinning and fleshing apparatus comprising: a hogside pulling drum; rotational drive means operably connected to said drum to drivingly revolve it on its axis in one direction for pulling a hogside around its periphery; hogside feed-in support means extending to the drum along one side thereof; skinning blade mounting means adjacent the ends of said drum; skinning blade means supported by said mounting means and extending axially along a peripheral portion of said drum, closely spaced from said drum arcuately between said feed-in support means and the top of said drum; and spaced from said feed-in support means in the direction of rotation of said drum; fleshing roll mounting means adjacent the top of said drum; a fleshing roll rotatably supported on said mounting means and positioned closely adjacent the top of said drum, spaced arcuately from said blade means in the direction of rotation of said drum; said roll being spring biased toward said drum, and shiftable against the bias away from said drum; drive means operably connected to said fleshing roll; meat slab guide surface means extending from said blade means, over said fleshing roll; and meat advancing means operably associated with said guide surface means and driven in a direction away from said blade means.

6. The apparatus in claim 5 wherein said advancing means comprises a powered articulated recirculatory means having presser portions spaced above said guide surface means and shiftably mounted to be biased downwardly against a meat slab on said guide surface means to advance it up and over said fleshing roll.

7. A fleshing apparatus for skins comprising: a rotational drum; rotational drive means for revolving said drum in one direction; fleshing roll means mounted adjacent the periphery of said drum; rotational drive means operably connected to said fleshing roll means to drive the fleshing roll periphery in a direction counter to the drum surface rotational direction; said drum having an elongated, axially extending clamping means; a feed-in support directed to one side of said drum to feed a skin to said clamp; and skin severing means beneath said support adjacent said drum and movable against said skin to sever the clamped portion of skin from the remaining skin.

8. A fleshing apparatus for skins comprising: a clamping drum having a peripheral clamping means; rotational drive means for revolving said drum in one direction; fleshing roll means mounted adjacent the periphery of said drum; rotational drive means operably connected to said fleshing roll means to drive the fleshing roll periphery in a direction counter to the drum surface rotational direction; said clamping drum having an elongated, axially extending clamping means; a feed-in support directed to one side of said drum toward said clamping means; said clamping means including a blade contacting surface; and severing blade means shiftable against the skin and said surface to sever the clamped skin portion.

9. The apparatus in claim 9 wherein said shiftable blade means comprises a revolving, powered blade movable along said clamp from one end to the other, and then in reverse back to said one end.

10. The apparatus in claim 10 wherein wiper means is shiftable across said clamp with said reverse movement to push the severed skin segment out of said clamping means.

11. Fleshing apparatus comprising: a revolvable pulling drum having an axially elongated clamp recessed in its periphery to clamp a segment of skin for fleshing; rotational drive means operably connected to said drum to rotate it a revolution at a time; said clamp including a fixed jaw and shiftable jaw means cooperable therewith; a powered, revolving, circulatory blade and motor means; guideways along the length of said clamp and mounting said blade and motor means; means to shift said blade and motor means in one direction and then in reverse along said guideways after a revolution of said drum, with said blade against said fixed jaw, to cause said blade to sever off the clamped segment of skin and then to reversibly return; wiper means mounted to move along said guideways with said blade and motor means; said wiper means being shiftable against a bias to rub over the surface of said skin during the cutting shift, and engageable with said clamped skin segment to wipe the severed segment out of the opened clamp on the return stroke.

12. A method of treating a single or double hogside having a layer of skin and a layer of fat back and bacon type meat thereon comprising the steps of: placing the hogside on the periphery of a rotational drum with said layer of fat back and bacon type meat exposed outwardly, clamping an edge of said hogside to the drum; rotating the drum in the direction of the clamped edge while retaining a skinning blade edge adjacent the drum periphery at a spacing therefrom about equal to the thickness of said layer of skin to slice between said layers and thereby separate the layer of fat back and bacon type meat from the layer of skin and the drum while also exposing a surface on said layer of skin; and then, while continuing to rotate the drum, pressing a rotating flesher cylinder against the freshly exposed surface of said layer of skin on said rotating drum to remove residual fleshy tissue from said skin layer.

13. A method of treating a single or double hogside having a layer of skin and a layer of fat back and bacon type meat thereon comprising the steps of: feeding a hogside, with the skin layer down, to about the 3 o'clock position of the periphery of a stationary rotational drum on a horizontal axis; clamping the leading edge of the hogside to the periphery of the stationary drum; rotating the drum through a complete revolution with said clamped edge passing consecutively through the 12 o'clock position, 9 o'clock position and 6 o'clock position; retaining a skinning blade edge betwen said 3 o'clock and 12 o'clock positions and spaced from the drum periphery about the thickness of said skin layer to separate the layers and expose a fresh surface of skin still containing some residual fleshly tissue thereon; then pressing against said fresh surface between said 12 o'clock and 9 o'clock positions of said drum a rotating flesher cylinder that pushes said skin against said drum, to remove said residual fleshy tissue; and then releasing said skin from said drum.

References Cited
UNITED STATES PATENTS

| | | | |
|---|---|---|---|
| 601,809 | 4/1898 | Jones | 69—42 |
| 782,992 | 2/1905 | Schmidt et al. | 146—130 |
| 802,878 | 10/1905 | Perkins | 69—42 |
| 1,002,879 | 9/1911 | Staniszewski | 69—42 |
| 2,292,319 | 8/1942 | Dziedic et al. | 146—130 |

FOREIGN PATENTS 383,176    12/1907    France.

WILLIAM W. DYER, JR., *Primary Examiner.*

JAMES M. MESTER, *Examiner.*